United States Patent
Kamiyama

(10) Patent No.: US 11,358,560 B2
(45) Date of Patent: Jun. 14, 2022

(54) SIDE CURTAIN AIR BAG

(71) Applicant: NIHON PLAST CO., LTD., Fujinomiya (JP)

(72) Inventor: Takuya Kamiyama, Fujinomiya (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 17/082,985

(22) Filed: Oct. 28, 2020

(65) Prior Publication Data

US 2021/0122321 A1  Apr. 29, 2021

(30) Foreign Application Priority Data

Oct. 29, 2019 (JP) .............................. JP2019-196588

(51) Int. Cl.

| *B60R 21/232* | (2011.01) |
| *B60R 21/233* | (2006.01) |
| *B60R 21/213* | (2011.01) |
| *B60R 21/237* | (2006.01) |
| *B60R 21/00*  | (2006.01) |

(52) U.S. Cl.
CPC .......... *B60R 21/232* (2013.01); *B60R 21/213* (2013.01); *B60R 21/233* (2013.01); *B60R 21/237* (2013.01); *B60R 2021/0009* (2013.01); *B60R 2021/23324* (2013.01)

(58) Field of Classification Search
CPC .... B60R 2021/0009; B60R 2021/0048; B60R 2021/23107; B60R 2021/23308; B60R 2021/23316; B60R 2021/23324; B60R 21/213; B60R 21/232; B60R 21/233; B60R 21/237

See application file for complete search history.

(56) References Cited

U.S. PATENT DOCUMENTS

| 7,775,553 B2 * | 8/2010 | Takemura | ............. B60R 21/232 |
| | | | 280/730.2 |
| 7,784,823 B2 * | 8/2010 | Heigl | .................... B60R 21/232 |
| | | | 280/730.2 |

(Continued)

FOREIGN PATENT DOCUMENTS

| JP | 2016088267 A | * | 5/2016 |
| JP | 2018016164 A | | 2/2018 |

*Primary Examiner* — Laura Freedman

(74) *Attorney, Agent, or Firm* — Procopio, Cory, Hargreaves & Savitch LLP

(57) ABSTRACT

An airbag includes an airbag body having a first expansion portion, a second expansion portion, a first non-expanding part, and a second non-expanding part. While the airbag body is in a deployed state, the first expansion portion is disposed on a side of an occupant; the second expansion portion is disposed at a front side of the first expansion portion and is enlarged downward with respect to the first expansion portion; the first non-expanding part includes a first extending part extending downward from an upper part of the second expansion portion and a second extending part extending upward from a lower part of the second expansion portion, and has an opening between a tip of the first extending part and a tip of the second extending part; and the second non-expanding part is disposed rearwardly apart from the opening and extends at least partially along the first non-expanding part.

4 Claims, 4 Drawing Sheets

(56) References Cited

U.S. PATENT DOCUMENTS

| | | | | |
|---|---|---|---|---|
| 8,967,660 | B2* | 3/2015 | Taguchi | B60R 21/232 280/729 |
| 9,108,588 | B2* | 8/2015 | Fukawatase | B60R 21/233 |
| 9,272,682 | B2* | 3/2016 | Wang | B60R 21/232 |
| 9,296,360 | B2* | 3/2016 | Komamura | B60R 21/0136 |
| 9,469,269 | B2* | 10/2016 | Hiruta | B60R 21/231 |
| 9,487,178 | B2* | 11/2016 | Kawamura | B60R 21/237 |
| 9,487,179 | B2* | 11/2016 | Takedomi | B60R 21/232 |
| 9,487,180 | B2* | 11/2016 | Nakashima | B60R 21/213 |
| 9,505,371 | B2* | 11/2016 | Kawamura | B60R 21/237 |
| 9,539,978 | B2* | 1/2017 | Mazanek | B60R 21/23138 |
| 9,610,916 | B2* | 4/2017 | Kawamura | B60R 21/232 |
| 9,731,676 | B2* | 8/2017 | Nagasawa | B60R 21/2346 |
| 9,744,935 | B2* | 8/2017 | Ohno | B60R 21/237 |
| 9,744,936 | B2* | 8/2017 | Kruse | B60R 21/233 |
| 9,862,349 | B2* | 1/2018 | Fujiwara | B60R 21/232 |
| 9,950,686 | B2* | 4/2018 | Hiraiwa | B60R 21/232 |
| 9,956,936 | B2* | 5/2018 | Ikenohata | B60R 21/23138 |
| 9,994,184 | B2* | 6/2018 | Deng | B60R 21/0136 |
| 9,994,186 | B2* | 6/2018 | Fukawatase | B60R 21/23138 |
| 9,994,187 | B2* | 6/2018 | Okuhara | B60R 21/213 |
| 10,000,174 | B2* | 6/2018 | Okuhara | B60R 21/232 |
| 10,000,178 | B2* | 6/2018 | Fukawatase | B60R 21/233 |
| 10,071,703 | B2* | 9/2018 | Ikenohata | B60R 21/2338 |
| 10,293,776 | B2* | 5/2019 | Ohno | B60R 21/235 |
| 10,501,044 | B2* | 12/2019 | Moon | B60R 21/233 |
| 10,618,493 | B2* | 4/2020 | Suzuki | B60R 21/213 |
| 10,661,744 | B2* | 5/2020 | Okuhara | B60R 21/237 |
| 10,661,747 | B2* | 5/2020 | Hioda | B60R 21/216 |
| 10,723,303 | B2* | 7/2020 | Hioda | B60R 21/213 |
| 10,836,342 | B2* | 11/2020 | Hayashi | B60R 21/213 |
| 10,882,485 | B2* | 1/2021 | Hayashi | B60R 21/23138 |
| 11,021,130 | B2* | 6/2021 | Gwon | B60R 21/232 |
| 11,084,450 | B2* | 8/2021 | Ohno | B60R 21/213 |
| 11,148,633 | B2* | 10/2021 | Hioda | B60R 21/205 |
| 11,155,231 | B2* | 10/2021 | Ohno | B60R 21/235 |
| 2019/0389419 | A1* | 12/2019 | Kakimoto | B60R 21/232 |
| 2021/0086718 | A1* | 3/2021 | Wang | B60R 21/213 |

* cited by examiner

SIDE CURTAIN AIR BAG

CROSS REFERENCE TO RELATED APPLICATION

This application is based upon and claims the benefit of priority from the prior Japanese Patent Application No. 2019-196588 (filing date: Oct. 29, 2019), the entire contents of which are incorporated herein by reference.

BACKGROUND

Technical Field

The present disclosure relates to an airbag having an airbag body configured to deploy at a side in a passenger compartment and to inflate in a vehicle width direction.

Related Art

Conventionally, as an airbag device provided with an airbag configured to deploy and inflate by introducing gas, a so-called curtain airbag device in which a longitudinal airbag configured to deploy in a front-rear direction along a predetermined plane including a pillar at a side of a passenger compartment of an automobile and a window of a door is known. The airbag for such an airbag device is folded into an elongated shape and arranged along a roof side part at an upper edge of a window, at normal times. When a vehicle is impacted by a side collision or a rollover, gas is supplied to the airbag from an inflator, and the airbag inflates and deploys downward along a side window or the like to restrain an occupant and protect a head or the like of the occupant.

In such an airbag, in addition to occupant restraining performance at a head-on collision, occupant-restraining performance at an oblique collision in which a part of a vehicle collides with an obstacle from an oblique direction is required in recent years. As such airbag, an airbag configured to suppress rotation of the head in a vertical direction as an axis by restraining entire head of the occupant with a restraining surface having a flat area extended in the front-rear direction when the occupant is moved and thrown obliquely forward by an oblique collision (See pages 7 to 9 and FIG. 2 in JP 2018-16164A).

SUMMARY

In the above configuration, although the suppression of the rotation of the head is taken into consideration, another configuration is required for preventing the occupant from being thrown out of the vehicle when the occupant is moved obliquely forward by the oblique collision.

The present disclosure discloses an airbag, which prevents an object to be protected from being thrown out of a vehicle while suppressing a rotation of the object to be protected.

An airbag according to a present embodiment includes an airbag body formed in a bag shape and configured to deploy from a folded state at a side in a passenger compartment and to inflate in a vehicle width direction when gas is supplied. The airbag body includes: a first expansion portion disposed on a side of an occupant while the airbag body is in a deployed state; a second expansion portion disposed at a front side of the first expansion portion and enlarged downward with respect to the first expansion portion while the airbag body is in the deployed state; a first non-expanding part comprising a first extending part extending downward from an upper part of the second expansion portion and a second extending part extending upward from a lower part of the second expansion portion while the airbag body is in the deployed state, and having an opening formed between a tip of the first extending part and a tip of the second extending part; and a second non-expanding part disposed rearwardly apart from the opening and extending at least partially along the first non-expanding part while the airbag body is in the deployed state.

According to the airbag having the above described configuration, an inflated shape of a surface of an air chamber formed between the first non-expanding part and the second non-expanding part is formed to be flat with respect to the vehicle width direction by adjusting positions of the first non-expanding part and at least a part of the second non-expanding part extending along the first non-expanding part. Since the inflated shape of the chamber is formed to be flat with respect to the vehicle width direction, rotation of an object to be protected, such as a head of the occupant restrained with the chamber in a side collision, in the vertical direction as an axis can be suppressed. Further, by adjusting the arrangement of each extending parts of the first non-expanding part and the second non-expanding part, a thickness of the airbag body in an inflated state may be made uniform in a front-rear direction at a region from the chamber between the first non-expanding part and at least a part of the second non-expanding part to a chamber at a front-side of the first non-expanding part via the opening formed between the extending parts. Since the non-expanding part is not formed in the region and the thickness of the airbag body in the inflated state is made uniform, rotation of the object to be protected in the vertical direction as an axis can be suppressed while the airbag body receive the head or the like of the occupant is thrown and moved along the region by an oblique collision. In addition, since the second expansion portion enlarged downward with respect to the first expansion portion is caught on a side part of the passenger compartment and hold the airbag body in the passenger compartment, it is possible to prevent an object to be protected, such as an occupant, from being thrown out of the vehicle when an oblique collision occurred and the occupant is moved toward the chamber on the front-side of the first non-expanding part.

While the airbag body is in the deployed state, a part of the second expansion portion at the front side of the first non-expanding part may be disposed at a position in the front-rear direction including a position of a side of a frontal airbag being deployed in front of the occupant.

While the airbag body is in the deployed state and a part of the second expansion portion at the front side of the first non-expanding part is disposed at a position in the front-rear direction including the position of the side of the frontal airbag being deployed in front of the occupant, the amount of overlap in the vehicle width direction between the frontal airbag and the airbag body can be easily adjusted by adjusting the positions of the each extending parts of the first non-expanding part. Accordingly, the second expansion portion and the frontal airbag may surely receive the object to be protected, such as a head of the occupant, even when the object to be protected is thrown and moved obliquely forward by an oblique collision.

DETAILED DESCRIPTION

Various embodiments will be described hereinafter with reference to the accompanying drawings.

Figure 5:
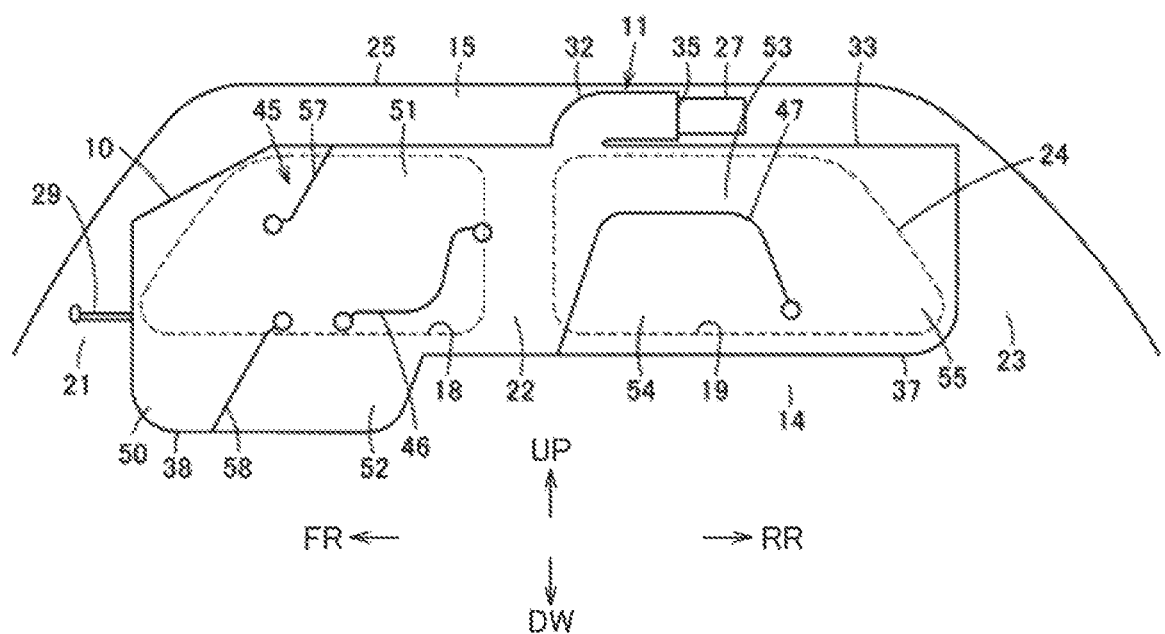
FIG. 5 is a side view illustrating a state in which the airbag according to the present embodiment is mounted to a vehicle body, from inside of a passenger compartment.

FIG. 5 is a view illustrating a state in which an airbag 10 of the present embodiment is mounted to a vehicle body, from inside of a passenger compartment. An airbag device 11 including the airbag 10 is called a curtain airbag device or the like, and is arranged on a roof side part 15 as a storage position in a passenger compartment 14 of the vehicle body of an automobile being a vehicle. The airbag 10 is also referred to as a curtain airbag, a side impact airbag, an inflatable curtain, or a head protection airbag. The airbag 10 is deployed downward in a predetermined direction in a substantially planar manner on a side of an occupant serving as the object to be protected while the occupant is subjected to an impact of a side collision or rolls over, thereby protecting a head of the occupant or the like.

Hereinafter, a front-side direction FR and a rear-side direction RR in a front-rear direction and an up-side UP, and a down-side DW in a vertical direction will be described with reference to the straight-ahead direction of the vehicle. In FIGS. 2 to 4 and 7, an outer side OT of the passenger compartment 14 and an inner side IN of the passenger compartment 14 in a vehicle-width direction perpendicular to the front-rear direction and the vertical direction are also illustrated with arrows.

The vehicle body of the automobile is provided with front seats and rear seats, which are seats where the occupant can be seated in the passenger compartment 14. A door (not illustrated) including a first window 18 (side window) and a door (not illustrated) including a second window 19 (side window) are provided at a position corresponding to the front seat and the rear seat, respectively. The first window 18 and the second window 19 cover the upper part of each door with an openable glass. Further, on both sides of the passenger compartment 14, front pillars 21 as columnar bodies also called A-pillars, center pillars 22 as columnar bodies also called B-pillars, and rear pillars 23 as columnar bodies also called C-pillars are provided in order from the front side. On one side of the passenger compartment 14, the first window 18 is positioned on a rear side of the front pillar 21 and on the front-side of the center pillar 22, and the second window 19 is positioned on a rear side of the center pillar 22 and on the front-side of the rear pillar 23. The first window 18, the second window 19, the door, and the pillars 21, 22, and 23 forms a predetermined plane 24 at which the airbag 10 is deployed on both sides of the passenger compartment 14. On the upper side of the pillars 21, 22, and 23, that is, on the upper edge including edge parts of the first window 18 and the second window 19, a body panel 25, which is a member to be mounted, also called a roof side rail or the like, is provided. A ceiling panel as a ceiling part is supported via the body panel 25. On the front side of the front pillars 21 on both sides in the vehicle width direction, a windshield (front windshield) is provided. On a rear side of the rear pillars 23 on both sides in the vehicle width direction, a rear glass is provided. The roof side part 15, as a storage position of the airbag 10, is set to a part covering almost the entire length and includes edge parts on both sides in the vehicle width direction of the ceiling panel and the front pillar 21 and the rear pillar 23 extending in a direction crossing the edge pans. That is, the predetermined plane 24 is set inside an arc virtually formed by the edge part of the ceiling panel, the front pillar 21, and the rear pillar 23.

The center pillar 22 is not a pillar at a front end or a rear end, but a pillar to be covered by the airbag 10 while being deployed. In the present embodiment, three pillars 21, 22, and 23 are arranged on one side of the vehicle body. However, depending on a type of a vehicle, four or more pillars may be provided on one side, for example. Here, the pillars from the third onwards from the front side will be described as the rear pillar 23.

The airbag device 11 is a so-called front and rear seat airbag device capable of protecting the occupants seated in front seats and the rear seats. The airbag device 11 includes the airbag 10 which is folded and stored in an elongated shape along the roof side part 15, and an inflator 27 which is a gas generator stored at a rear-side or above the rear seat and configured to supply gas to the airbag 10. The roof side part 15 is a part surrounded by the body panel 25 and a head lining which is a ceiling covering member as an interior material continuous from the upper ends of respective pillars 21, 22, 23 to the ceiling, or the like; and the roof side part 15 is a part arranged along the upper edge of a door opening of the vehicle body. The airbag device 11 further includes a bracket (not illustrated) formed by pressing a metal plate and configure to mount the airbag 10 to the body panel 25, a sleeve as a breakable cylindrical or string-like shaped retaining member configured to retaining a shape of the airbag 10 being folded, and a tether belt 29 as a tether connected to a front end of the airbag 10. The inner sides of the respective pillars 21, 22, and 23 in the passenger compartment 14 are covered with a cover body as a structure, that is, a pillar garnish as a covering interior material.

Figure 1:
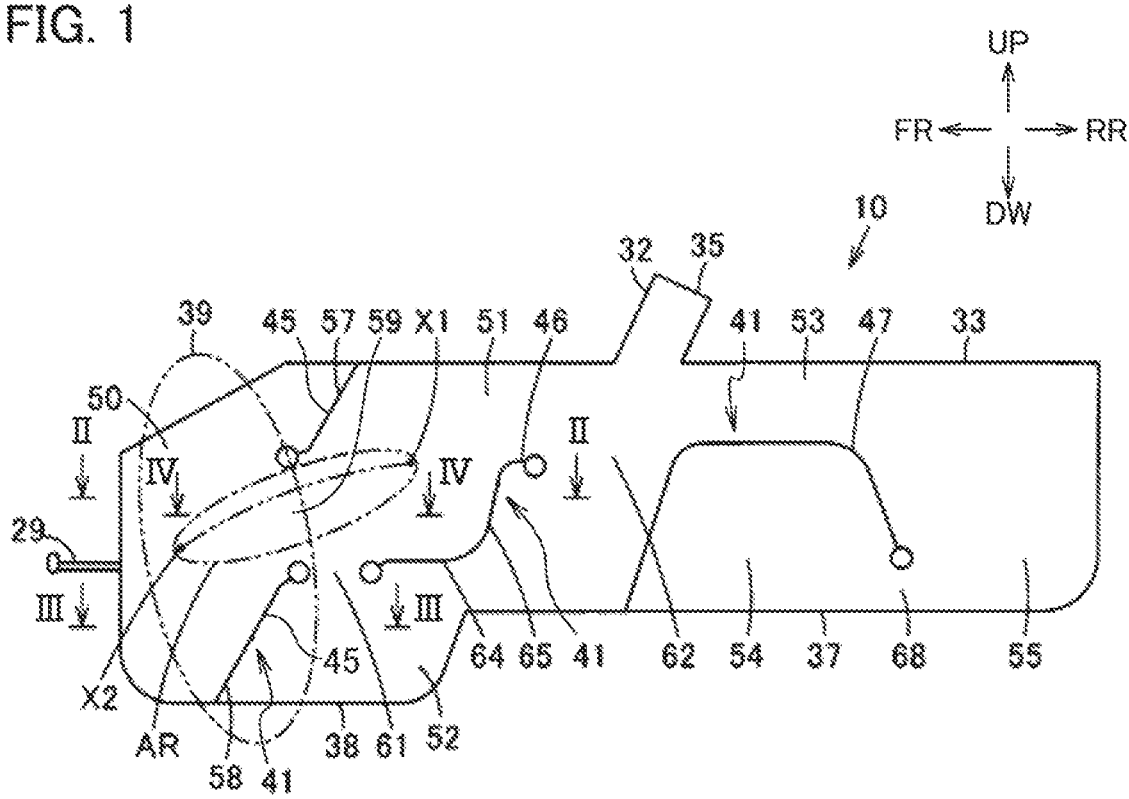
FIG. 1 is a side view illustrating an airbag according to the present embodiment.

The airbag 10 illustrated in FIGS. 1 and 5 is provided with a gas inlet 32 as an inflator connecting part to which the inflator 27 is inserted and connected and gas is introduced into the airbag 10, and an airbag body 33 formed in a flat bag shape. The airbag 10 is mounted on the vehicle body side at a plurality of positions of the upper edge part via a plurality of mounting parts. A front-end part of the airbag 10 is attached to the vehicle body by the tether belt 29, for example, and the airbag 10 in an elongated-folded state is housed longitudinally along the front-rear direction in the roof side portion 15 above the center pillar 22. In the present embodiment, the airbag 10 is of a so-called center-mount type, and the gas inlet 32 projects from the central part in the longitudinal direction at the upper side of the airbag body 33. The airbag 10 may be of a rear-mount type in which the gas inlet 32 projects from a rear part at the upper side of the airbag body 33.

The gas inlet 32 and the airbag body 33 are made of one or a plurality of base fabrics. Specifically, an outer edge of the base fabrics are joined by sewing or the like, whereby the gas inlet 32 and the airbag body 33 are formed in the airbag 10. A rear end or an upper end of the gas inlet 32 is an insertion opening 35 configured to insert the inflator 27.

The airbag body 33 is formed with a first expansion portion 37 and a second expansion portion 38 configured to inflate by introduction of gas.

The first expansion portion 37 may be referred to as an airbag reference portion. The first expansion portion 37 is arranged on a side of the occupant in a deployed state. The first expansion portion 37 is an expansion portion configured to protect a side part of an occupant seated in the rear seat. In other words, the first expansion portion 37 is a portion that deploys to a front and rear area extending from the from seat to the rear seat of the predetermined plane 24 at a side. The first expansion portion 37 is formed longitudinally along the front-rear direction. The first expansion portion 37 forms a center part or the rear part of the airbag body 33 in the front-rear direction.

The second expansion portion 38 is arranged at the front side of the first expansion portion 37 in the deployed state. The second expansion portion 38 is an expansion portion configured to protect a side part of an occupant seated in the front seat. The second expansion portion 38 is a portion configured to prevent the occupant seated in the front seat from being thrown out from the first window 18 of the vehicle. The second expansion portion 38 is a portion that deploys to a front area of the front seat of the predetermined plane 24. The second expansion portion 38 is formed so as to be enlarged downward with respect to the first expansion portion 37. That is, the lower part of the second expansion portion 38 projects downward with respect to the lower part of the first expansion portion 37. The lower part of the second expansion portion 38 protrudes below the lower edge of the first window 18 and is engaged with the door trim, while the airbag body 33 is in the deployed state. The second expansion portion 38 forms a front part of the airbag body 33 in the front-rear direction. The second expansion portion 38 has a shorter front-to-rear dimension than the first expansion portion 37. The second expansion portion 38 is positioned to face a side part of a frontal airbag 39, which deploys in front of the occupant while in the deployed state. The frontal airbag 39 is housed in a folded state, and deploys and inflates in front of the occupant seated in the front seat by the introduction of gas from an inflator (not illustrated) to restrain the occupant who is thrown forward and moved by a head-on collision, an oblique collision or the like. The frontal airbag 39 is an airbag for a driver's seat housed in a steering wheel or an airbag for a passenger's seat housed in an instrument panel.

As illustrated in FIG. 1, in the airbag body 33, a plurality of non-expanding parts 41, which are a plurality of restricting parts configured to restrict the flow of gas, are formed, and a plurality of air chambers are formed in the first expansion portion 37 and the second expansion portion 38. The non-expanding parts 41 is formed as joining parts by joining the base fabrics forming the airbag body 33. Each of the non-expanding parts 41 is formed in a line shape. At a tip of each non-expanding parts 41, a protective part in which a base fabric is joined in a circular shape is formed. By forming such a protective part, it is possible to secure the stretching of the base fabric and prevent the occurrence of wrinkles during deployment and inflation, and to obtain sufficient strength against stress concentration occurring at the tip of the non-expanding parts 41 during deployment and inflation of the airbag body 33. Hereinafter, the positional relationship and shape of each part such as the non-expanding parts 41 will be described with reference to the deployed state of the airbag body 33.

As the non-expanding parts 41, a first non-expanding part 45 and a second non-expanding part 46 are formed. In the present embodiment, the non-expanding parts 41 further includes a third non-expanding part 47. The second non-expanding part 46 is positioned on a rear side of the first non-expanding part 45, and the third non-expanding part 47 is positioned on a rear side of the second non-expanding part 46. Among the non-expanding parts 41, the first non-expanding part 45 is positioned at a foremost part and the third non-expanding part 47 is positioned at a rearmost part. At a front side of the first non-expanding part 45, a front-end chamber 50, the front-end chamber 50 being a restraining part capable of coping with an oblique collision and which is a first air chamber, is partitioned. At the rear of the first non-expanding part 45 and in front of the third non-expanding part 47, a front main chamber 51 as a front restricting part, which is a second air chamber, and a front auxiliary chamber 52 as a front adjusting part, which is a third air chamber, are partitioned above and below the second non-expanding part 46. Above and below the third non-expanding part 47, a gas-flow path 53 as a communicating part and a rear auxiliary chamber 54 as a rear adjusting part, which is a fourth air chamber, are partitioned. Then, behind the third non-expanding part 47, a rear main chamber 55 as a rear restricting part, which is a fifth air chamber, is partitioned. Four or more non-expanding parts may be provided as the non-expanding parts 41.

At least a part of the first non-expanding part 45 is arranged in the second expansion portion 38. The first non-expanding part 45 includes a first extending part 57 and a second extending part 58. The first extending part 57 extends downward from the upper part of the second expansion portion 38, and the second extending part 58 extends upward from the lower part of the second expansion portion 38. A tip of the first extending part 57 and a tip of the second extending part 58 are separated in the vertical direction. Further, between the first extending part 57 and the second extending part 58 inside the second expansion portion 38, an opening 59 is formed. That is, the first non-expanding part 45 is formed intermittently in the vertical direction by the opening 59.

The first extending part 57 is a part setting a shape of the front main chamber 51 so as to expand the front main chamber 51 to a nearly flat shape by regulating a width of the front main chamber 51 in the vehicle width direction. The first extending part 57 linearly and inclinedly extends from the upper part of the second expansion portion 38 toward the lower front side. A base end of the first extending part 57 is disposed near the rear part of the second expansion portion 38, that is, near the position where the second expansion portion 38 is continuous with the first expansion portion 37. The base end of the first extending part 57 is continued to a joining part joining the outer edge of the airbag body 33. The tip of the first extending part 57 extends to the inner side of the second expansion portion 38. That is, at least the tip of the first extending part 57 is located in the second expansion portion 38. The tip of the first extending part 57 is positioned above a center of the second expansion portion 38 in the vertical direction.

The second extending part 58, together with the first extending part 57, is a part setting an overlap length OL in the vehicle width direction between the airbag body 33 (the front main chamber 51, the front-end chamber 50, or a trajectory area AR described later) and the frontal airbag 39 (see FIG. 3). The second extending part 58 linearly and inclinedly extends from the lower part of the second expansion portion 38 toward an upper rear side. An inclination angle of the second extending part 58 with respect to the vertical direction is smaller than an inclination angle of the first extending part 57 with respect to the vertical direction. That is, the second extending part 58 has an inclination angle closer to the vertical direction than that of the first extending part 57. The base end of the second extending part 58 is disposed in the lower part of the second expansion portion 38 near the center in the front-rear direction or near the front part. The base end of the second extending part 58 is positioned on the front side of the base end of the first extending part 57. The base end of the second extending part 58 is continued to the joining part joining the outer edge of the airbag body 33. The tip of the second extending part 58 is located inside the second expansion portion 38. That is, the second extending part 58 is located entirely within the second expansion portion 38 from the base end to the tip end. The tip of the second extending part 58 may be forward or rearward of the tip of the first extending part 57. In the present embodiment, the tip of the second extending part 58 is positioned vertically below the tip of the first extending part 57.

The opening 59 communicates the front-end chamber 50 with the front main chamber 51. The opening 59 is located in the trajectory area AR. The trajectory area AR is an area including a trajectory of a head of the occupant when an oblique collision occurred, extending in the longitudinal direction from the front main chamber 51 to the front-end chamber 50, at which a head of the occupant moves from a position X1 at the front main chamber 51, being an initial restraint position of the head, to a position X2 at the front-end chamber 50, being an restraint position of the occupant where the occupant is restrained by the frontal airbag 39. In this case, the head of the occupant is the object to be protected. That is, in the present embodiment, the trajectory area AR extends through the opening 59 from the front main chamber 51 to the front-end chamber 50, and no non-expanding part is formed in the trajectory area AR.

The second non-expanding part 46 is disposed near the center of the airbag body 33 in the vertical direction. That is, the second non-expanding part 46 is positioned apart from the joining part joining the outer edge of the airbag body 33. The second non-expanding part 46 is located rearwardly apart from the opening 59. The second non-expanding part 46 is disposed to be opposed to the opening 59 in the front-rear direction. A width in the vertical direction of the second non-expanding part 46 is equal to or substantially equal to a width of the opening 59 in the vertical direction. Between the second non-expanding part 46 and the first non-expanding part 45, a communication opening 61 communicating the front main chamber 51 with the front auxiliary chamber 52 is formed. Between the second non-expanding part 46 and the third non-expanding part 47, a ventilation opening 62 communicating the front auxiliary chamber 52 with the gas-flow path 53 is formed.

The second non-expanding part 46 integrally includes a front part 64 at a front side and a rear part 65 at a rear side, as a shape setting part.

The from part 64 extends in the from-rear direction. The front part 64 is at a position equal to or substantially equal to an upper end part, or a tip, of the second extending part 58 of the first non-expanding part 45, in the vertical direction. The communication opening 61 is formed on a front side of a front end of the front part 64, where the front part 64 being a front end part of the second non-expanding part 61.

The rear part 65 is a shape setting part of the front main chamber 51 so as to expand the front main chamber 51 into generally flat shape by restricting a width at the rear side of the front main chamber 51 in the vehicle width direction.

The rear part 65, together with the first extending part 57, is a part for setting a thickness of the trajectory area AR of the airbag body 33 in a deployed and inflated state. The rear part 65 extends along a direction intersecting the front part 64. In the present embodiment, the rear part 65 continuously extends upward from a rear end of the front part 64. The rear part 65 extends inclined toward the rear upper side. That is, the rear part 65 extends in a direction along the first non-expanding part 45. The rear part 65 may extend in a same direction or a substantially same direction as the first non-expanding part 45. Further, the rear part 65 may extend parallel or substantially parallel to the first extending part 57. Further, a rear end of the rear part 65 is bent and then extended rearward along the front-rear direction. Therefore, the second non-expanding part 46 is formed in a crank shape or an S-shape as a whole. The rear end of the rear part 65 is at a position equal to or substantially equal to a front end, or a lower end, of the first extending part 57 in the vertical direction. The ventilation opening 62 is formed at a rear side of the rear end of the rear part 65, which is a rear end part of the second non-expanding part 46.

The third non-expanding part 47 is disposed at the rear part of the airbag body 33. In the present embodiment, the third non-expanding part 47 is continuous with a lower part of the joining part joining the outer edge of the airbag body 33 at a base end of the third non-expanding part 47. The third non-expanding part 47 extends first toward the rear upper side at the base end, and then toward the rear side, and then toward the rear lower side at the tip, namely the third non-expanding part 47 is folded back in the vertical direction. Between the tip of the third non-expanding part 47 and the lower part of the joining part joining the outer edge of the airbag body 33, a rear-side communication opening 68 communicating the rear main chamber 55 with the rear auxiliary chamber 54 is formed. The third non-expanding part 47 is not limited to this, and may be formed intermittently at an arbitrary position as required.

The front-end chamber 50 is a section configured to restrain the head of the occupant at the front seat when thrown and moved to a front and vehicle outside direction by an oblique collision. The front-end chamber 50 is arranged in the second expansion portion 38. The front-end chamber 50 is arranged at the second expansion portion 38 in front of the first non-expanding part 45. In the present embodiment, the front-end chamber 50 is an air chamber positioned at the foremost part of the air chambers of the airbag body 33.

The front main chamber 51 is a section configured to restrain the head of the occupant at the front seat when thrown and moved to a vehicle outside direction by a side collision or a lateral collision. The front main chamber 51 is partitioned between the first extending part 57 of the first non-expanding part 45 and the second non-expanding part 46. Depending on positions of the first non-expanding part 45 and the second non-expanding part 46, a part of the front side or the whole of the front main chamber 51 may be disposed in the second expansion portion 38, or a part of the rear side or the whole of the front main chamber 51 may be disposed in the first expansion portion 37. In the present embodiment, a front side of the front main chamber 51 is disposed in the second expansion portion 38 and a rear side of the front main chamber 51 is disposed in the first expansion portion 37. In the present embodiment, the front main chamber 51 communicates directly with the gas inlet 32. However, the front main chamber 51 may communicate with the gas inlet 32 via the gas-flow path 53 in accordance with the position of the gas inlet 32.

The front auxiliary chamber 52 is configured to suppress an increase of internal pressure caused by restraint of the head of the occupant in the front main chamber 51 and/or the front-end chamber 50 by accepting a part of gas from the main chamber 51 and/or the front-end chamber 50, thereby maintaining the front main chamber 51 or the front-end chamber 50 at a stable constant internal pressure. Depending on positions of the first non-expanding part 45 and the second non-expanding part 46, a part of the front side or the whole of the front auxiliary chamber 52 may be disposed in the second expansion portion 38, or a part of the rear side or the whole of the front auxiliary chamber 52 may be disposed in the first expansion portion 37. In the present embodiment, a front side of the front auxiliary chamber 52 is disposed in the second expansion portion 38 and a rear side of the front auxiliary chamber 52 is disposed in the first expansion portion 37.

The gas-flow path 53 communicates the front main chamber 51 or the front auxiliary chamber 52 with the rear main chamber 55. The gas-flow path 53 is formed along the front-rear direction. The gas-flow path 53 is arranged in the first expansion portion 37.

The rear auxiliary chamber 54 is configured to suppress an increase of internal pressure caused by restraint of the head of the occupant in the rear main chamber 55 by accepting a part of gas from the rear main chamber 55, thereby maintaining the rear main chamber 55 at a stable constant internal pressure. The rear auxiliary chamber 54 is arranged in the first expansion portion 37.

The rear main chamber 55 is a section configured to restrain the head of an occupant at the rear seat when thrown and moved to the vehicle outside direction by a side collision. The rear main chamber 55 is disposed in the first expansion portion 37. In this embodiment, the rear main chamber 55 communicates with the gas inlet 32 via the gas-flow path 53. However, the present invention is not limited thereto. The rear main chamber 55 may directly communicate with the gas inlet 32 in accordance with the position of the gas inlet 32. In the present embodiment, the rear main chamber 55 is an air chamber located at the last portion of the air chambers of the airbag body 33.

When manufacturing the airbag 10, the manufacturing of the airbag 10 having the airbag body 33 and the gas inlet 32 is completed by joining the outer edge of the base fabrics into the joining part, and forming the non-expanding parts 41 by joining the base fabrics. The gas injection part of the inflator 27 is inserted into the insertion opening 35 of the gas inlet 32, and the inflator 27 exposed from the airbag 10 is integrally fixed to the airbag 10.

Further, the airbag 10 is folded into a predetermined elongated shape by any folding method, such as roll folding, bellows folding, or a combination thereof. The airbag 10 is held in the folded state by a sleeve or the like (not illustrated), the sleeve or the like configured to be uncoupled or to be breakable by a pressure causing deployment of the airbag 10. In this manner, the airbag 10 is folded into the predetermined elongated shape and the folded shape is held, and the airbag device 11 becomes a curtain airbag module.

Then, the airbag device 11 having the airbag 10 folded as described above is brought into the passenger compartment 14, and a mounting work to the vehicle body is performed before the interior material such as the head lining and the pillar garnish is mounted. This mounting work is performed by mounting and fixing a plurality of mounting parts of the airbag 10 and the tether belt 29 to the vehicle body by fixtures such as a bolt (not illustrated) or the like, and by fixing the inflator 27 to the roof side part 15. Further, a harness led out from the inflator 27 is connected to a control device provided on the vehicle body. Next, the head lining is attached to the ceiling panel of the vehicle body to cover the airbag device 11, and the pillar garnishes are respectively attached to the respective pillars 21, 22, 23 to complete the mounting work of the airbag device 11 to the vehicle body. In the mounted state, the airbag device 11 is isolated from the inside of the passenger compartment 14 by the head lining and the pillar garnish, and the inflator 27 inserted into the gas inlet 32 and the airbag body 33 in the folded state are held in a position above the pillar garnish.

When a side collision or a rollover including an oblique collision (or a head-on collision) of the vehicle occurred, the inflator 27 is actuated by the control device. The gas injected from the inflator 27 is introduced into the airbag body 33 after inflating the gas inlet 32. Thus, the airbag body 33 is inflated and deployed downward in a plane along the predetermined plane 24 of the side part of the passenger compartment 14 to protect the occupant. Similarly, the frontal airbag 39 is inflated and deployed in front of the occupant by the gas injected from the inflator to protect the occupant.

More specifically, when gas is supplied to the airbag 10 through the gas inlet 32, the gas introduced from the gas inlet 32 is supplied to both the front main chamber 51 and the rear main chamber 55. Therefore, the airbag body 33 is deformed so that the front main chamber 51, the gas-flow path 53, and the rear main chamber 55 deploy while inflating, and the lower end of the head lining is pushed away toward the interior side of the passenger compartment 14, and protrudes from the upper end of the pillar garnish into the passenger compartment 14, and is deployed downward along the predetermined plane 24. The front-end chamber 50 is supplied with gas through the opening 59 via the front main chamber 51. The front auxiliary chamber 52 is supplied with gas through the communication opening 61 via the front main chamber 51 or through the ventilation opening 62. Gas is supplied to the rear auxiliary chamber 54 through the rear-side communication opening 68 via the rear main chamber 55. Thus, the front-end chamber 50, the front auxiliary chamber 52 and the rear auxiliary chamber 54 are also deployed and inflated. In the second expansion portion 38, the front-end chamber 50 located in front of the first non-expanding part 45 is deployed to a position including a side part of the frontal airbag 39.

Figure 2:
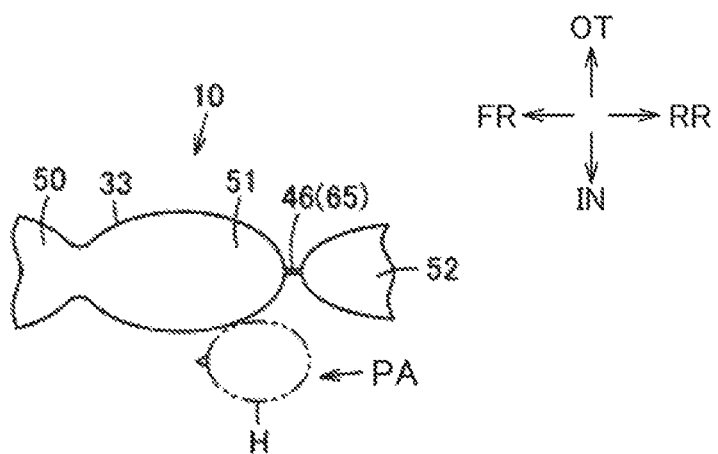
FIG. 2 is a cross-sectional view schematically illustrating the position illustrated in FIG. 1.

For example, as illustrated in FIG. 2, at the time of the side collision, the side part of the head H of the occupant PA thrown to the vehicle outside direction is restrained by the front main chamber 51 of the airbag body 33. In the front main chamber 51, as illustrated in FIG. 1, widths at the front side and the rear side are restricted by tuning positions of the first extending part 57 of the first non-expanding part 45 and the rear part 65 of the second non-expanding part 46, and the volume of the front main chamber 51 is controlled. Therefore, the front main chamber 51 expands in a flat shape along the front-rear direction as illustrated in FIG. 2. Therefore, when the side part of the head H comes into contact with the front main chamber 51, the rotation of the head H in the vertical axis as an axis, such that the from part of the head H is rotated away from the airbag-side and a rear part of the head H is rotated toward the airbag-side, is suppressed.

Figure 3:
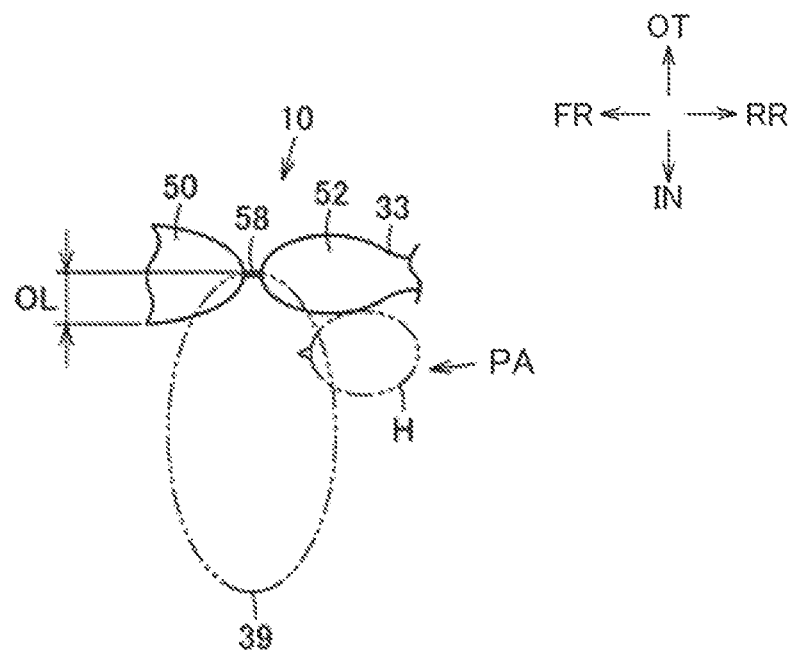
FIG. 3 is a cross-sectional view schematically illustrating the III-III position illustrated in FIG. 1.
Figure 4:
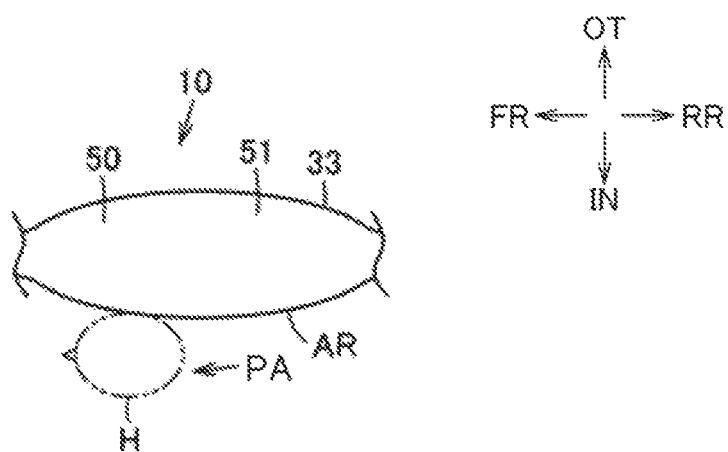
FIG. 4 is a cross-sectional view schematically illustrating the IV-IV position illustrated in FIG. 1.

Further, as illustrated in FIGS. 3 and 4, when the occupant PA is thrown obliquely forward by an oblique collision, the side part of the head H of the occupant PA is restrained by the front main chamber 51 of the airbag body 33, then moves from the position X1 at the front main chamber 51 to the position X2 at the front-end chamber 50, as illustrated in FIG. 1. The trajectory area AR extending from the front main chamber 51 to the front-end chamber 50 inflates flatly toward the vehicle width direction with a substantially uniform thickness along the front-rear direction as illustrated in FIG. 4 by tuning the position of the first extending part 57 and the second extending part 58 of the first non-expanding part 45. Therefore, when the head H is moved from the front main chamber 51 to the front-end chamber 50 along the trajectory area AR, rotation of the head H in the vertical direction as an axis, such that the front part of the head H is rotated away from the airbag-side and the rear part of the head H is rotated toward the airbag-side, is suppressed.

Figure 6:
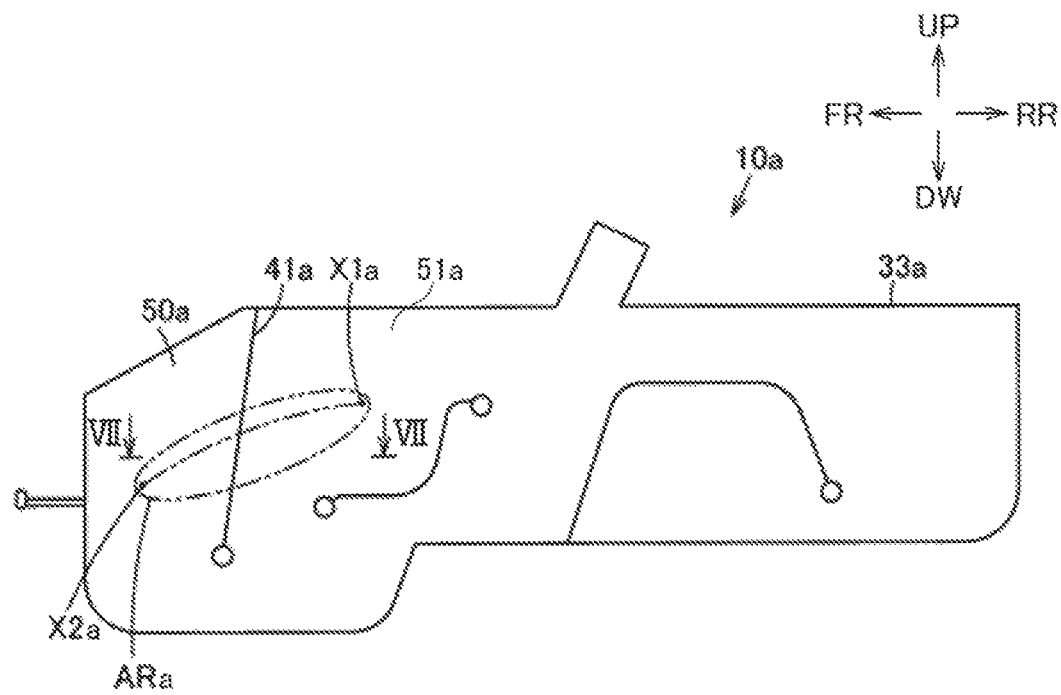
FIG. 6 is a side view illustrating an airbag of a comparative example.
Figure 7:
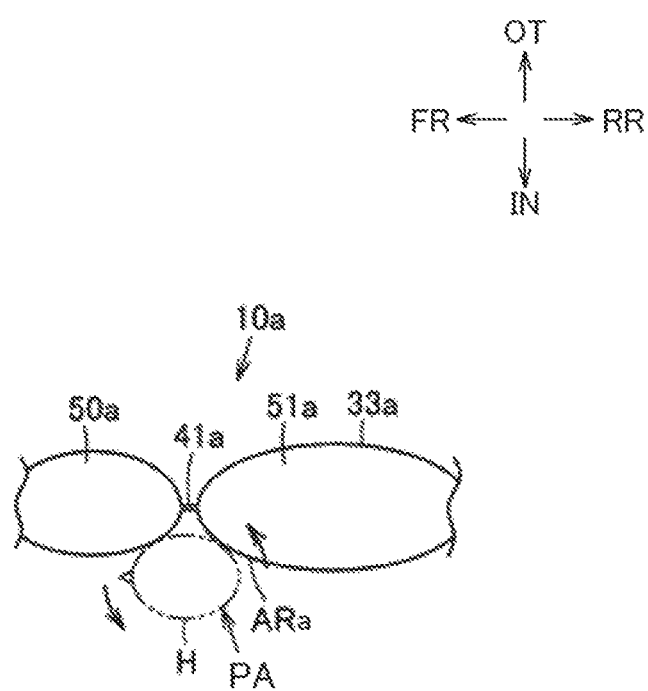
FIG. 7 is a cross-sectional view schematically illustrating the VII-VII position illustrated in FIG. 6.

On the other hand, in a case where a non-expanding part 41a is formed in a trajectory area ARa extending from a front main chamber 51a to a front-end chamber 50a (an area including positions X1a and X2a) of an airbag body 33a of an airbag 10a as in a comparative example illustrated in FIGS. 6 and 7, thickness in the vehicle width direction of the front main chamber 51a and the front-end chamber 50a at a front side and a rear side of the non-expanding part 41a are narrowed and surfaces of the front main chamber 51a and the front-end chamber 50a at the front side and the rear side of the non-expanding part 41a are curved in an inflated state of the airbag body 33a, and a step is formed at a position of the non-expanding part 41a. Therefore, in the airbag 10a illustrated as a comparative example, a head H of an occupant PA tends to rotate in the vertical direction as the axis.

In the present embodiment, as illustrated in FIG. 3, a front-side of the occupant PA moved forward is restrained by a rear surface of the frontal airbag 39 deployed to the front-side of the occupant PA by the introduction of gas. In other words, the occupant PA thrown forward obliquely at an oblique collision is received by the airbag 10 or/and the frontal airbag 39 overlapping the airbag body 33 of the airbag 10 in the vehicle width direction in an inflated and deployed state of the airbags 10 and 39. Accordingly, the occupant PA is received by the airbag 10 or/and the frontal airbag 39 without slipping out obliquely forward from between the airbag 10 and the frontal airbag 39.

Further, as illustrated in FIG. 5, since the front-end chamber 50 is positioned in the second expansion portion 38 of the airbag body 33, the lower part of the second expansion portion 38 is engaged with the door trim at the lower edge of the first window 18, whereby the airbag 10 is held in the passenger compartment 14 and prevents the occupant PA from being thrown out of the vehicle from the first window 18.

The front-end chamber 50 and the front main chamber 51 are pressed in the width direction by the restraint of the head H of the occupant PA, so that a part of the gas flows gradually into the front auxiliary chamber 52 through the opening 59 and the communication opening 61 and maintain an appropriate internal pressure.

In the rear main chamber 55, a head H of an occupant seated in the rear seat is restrained and protected. The rear main chamber 55 is pressed in the width direction by the restraint of the head H of the occupant PA, whereby a part of the gas flows gradually into the rear auxiliary chamber 54 through the rear-side communication opening 68 and maintain an appropriate internal pressure.

Thus, by setting the first non-expanding part 45 including the first extending part 57 extending downward from the upper part of the second expansion portion 38 deployed on the front side of the first expansion portion 37 and the second extending part 58 extending upward from the lower part of the second expansion portion 38, and the second non-expanding part 46 in which the rear part 65 extends in the direction along the first non-expanding part 45 in the deployed state, the expansion shape of the front main chamber 51, which is an air chamber formed between the first non-expanding part 45 and at least a part of the second non-expanding part 46 (the rear part 65), is formed to be flat with respect to the vehicle width direction by adjusting the positions of the first non-expanding part 45 and the at least apart of the second non-expanding part 46 extending along the same direction as each other, and the rotation of the head H of the occupant PA restrained by the front main chamber 51 in the vertical direction as the axis during a side collision, can be suppressed.

Further, in the present embodiment, the second non-expanding part 46 is disposed rearwardly apart from the opening 59 formed between tips of the first extending part 57 and the second extending part 58 of the first non-expanding part 45. The from main chamber 51 is an air chamber formed between the first non-expanding part 45 and at least a part of the second non-expanding part 46 (the rear side 65). The trajectory area AR extends from the front main chamber 51 through the opening 59 formed between the tip of the first extending part 57 and the tip of the second extending part 58 to the front-end chamber 50, which is the air chamber in front of the second non-expanding part 46. By adjusting the positions of the first extending part 57, the second extending part 58 of the first non-expanding part 45 and the second non-expanding part 46, a region in which a thickness of the airbag body 33 not including the non-expanding part 45 or 46 in an inflated state is uniform in the front-rear direction is formed in the trajectory area AR. Therefore, even if the object to be protected such as the head H of the occupant PA is thrown at the oblique collision, the object to be protected is prevented from rotating in the vertical direction as the axis when moving along the trajectory area AR.

Since the second expansion portion 38, which is expanded below the first expansion portion 37, engages to the side part of the passenger compartment 14 and hold the airbag body 33 inside the passenger compartment 14, it is possible to prevent an object to be protected such as an occupant, which is thrown in an oblique collision and moved toward the front-end chamber 50, which is the chamber in front of the first non-expanding part 45, from being thrown out of the vehicle.

In this manner, rotation of the head H of the occupant PA in the vertical direction as the axis can be suppressed only by position tuning positions of the first non-expanding part 45 and the second non-expanding part 46 without using other members such as base fabrics or a special equipment for manufacturing or changing the output of the inflator 27. That is, it is possible to suppress the rotation of the head H the occupant PA while more effectively restraining the head of the occupant PA with an inexpensive configuration, thereby suppressing the injury criterion for brain injury of the occupant PA caused by the rotation.

In the deployed state of the airbag body 33, a part of the second expansion portion 38 on the front side of the first non-expanding part 45 is disposed at a position including a side part of the frontal airbag 39. Therefore, by adjusting the positions of the first extending part 57 and the second extending part 58 of the first non-expanding part 45, the overlap length OL in the vehicle width direction between the frontal airbag 39 and the airbag body 33 can be easily adjusted. As a result, the head H of the occupant PA thrown and moved obliquely forward by the oblique collision can be received by the second expansion portion 38 and the frontal airbag 39.

In the embodiment described above, the same operation and advantageous effect can be achieved even in the case of the rear mount type in which the inflator 27 is disposed, that is, the gas inlet 32 is disposed above the rear pillar 23.

The airbag 10 can exhibit the same operation and advantageous effect can be achieved regardless of the folding method of the airbag body 33 in the folded state (folding specification).

Further, although the airbag 10 is a curtain airbag deployed downward from the roof side part 15 along the predetermined plane 24, it can also be used, for example, as a so-called door mount airbag deployed upward from the upper portion of the door.

The present embodiment is applicable to an airbag and an airbag device for protecting an occupant by being mounted and deployed along a window of a side part of an automobile, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An airbag comprising;
    an airbag body formed in a bag shape and configured to deploy from a folded state at a side in a passenger compartment and to inflate in a vehicle width direction when gas is supplied, wherein
    the airbag body comprises:
        a first expansion portion configured to be disposed on a side of an occupant while the airbag body is in a deployed state;
        a second expansion portion disposed at a front side of the first expansion portion and enlarged downward with respect to the first expansion portion while the airbag body is in the deployed state;
        a first non-expanding part comprising a first extending part extending downward from an upper part of the second expansion portion and a second extending part extending upward from a lower part of the second expansion portion while the airbag body is in the deployed state, and having an opening formed between a tip of the first extending part and a tip of the second extending part; and
        a second non-expanding part disposed on a rear side of the opening and to be apart from the opening and at least a part of the second non-expanding part extends in a same direction as an extending direction of the first non-expanding part while the airbag body is in the deployed state,
        wherein the first extending part inclinedly extends from the upper part of the second expansion portion toward a lower front side, and the second extending part inclinedly extends from the lower part of the second expansion portion toward an upper rear side, and
        wherein an inclination angle of the second extending part with respect to a vertical direction is smaller than an inclination angle of the first extending part with respect to the vertical direction.

2. The airbag according to claim 1, wherein, while the airbag body is in the deployed state, a part of the second expansion portion at a front side of the first non-expanding part is disposed at a position in a front-rear direction including a position of a side of a frontal airbag configured to be deployed in front of the occupant.

3. The airbag according to claim 1, wherein a width in the vertical direction of the second non-expanding part is equal to a width of the opening in the vertical direction.

4. The airbag according to claim 1, wherein the second non-expanding part includes a front part at a front side and extending in a front-rear direction and a rear part at a rear side and extending upward from a rear end of the front part.

* * * * *